United States Patent
Bombeeck

(10) Patent No.: US 6,208,700 B1
(45) Date of Patent: Mar. 27, 2001

(54) APPARATUS FOR PROCESSING A SIGNAL RECEIVED VIA AN INFORMATION CARRIER

(75) Inventor: John M. Bombeeck, Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/102,475

(22) Filed: Jun. 22, 1998

(30) Foreign Application Priority Data

Jun. 26, 1997 (EP) .................................................. 97201949

(51) Int. Cl.$^7$ ...................................................... H04B 1/10
(52) U.S. Cl. .......................... 375/351; 375/217; 375/324; 375/316
(58) Field of Search .................................. 375/351, 316, 375/217, 324, 349, 329

(56) References Cited

U.S. PATENT DOCUMENTS

| | | | |
|---|---|---|---|
| 3,252,098 | * 5/1966 | Schlaepfer | 328/58 |
| 4,528,678 | * 7/1985 | Udren | 375/104 |
| 4,837,624 | * 6/1989 | Heitmann et al. | 358/166 |
| 4,905,102 | * 2/1990 | Schulz | 360/46 |
| 5,638,407 | * 6/1997 | Hatanaka et al. | 375/328 |
| 5,659,576 | * 8/1997 | Critchlow et al. | 375/219 |

FOREIGN PATENT DOCUMENTS

0084358 * 7/1990 (EP) .

* cited by examiner

Primary Examiner—Stephen Chin
Assistant Examiner—Mohammad Ghayour
(74) Attorney, Agent, or Firm—Steven R. Biren

(57) ABSTRACT

The invention relates to an apparatus for processing a signal received via an information carrier. The apparatus comprises a receiving unit (2) for receiving a signal from the information carrier, an equalizer (8) for equalizing the signal thus received, and a signal processing device (12). The signal processing device (12) has a first signal path (14) including time delay means (22), a second signal path including differentiation means adapted to effect at least two differentiations with respect to time, a decision circuit (26), and a controllable switching element (38). The decision circuit (26) is adapted to transfer a control signal, the decision circuit being adapted to supply a control signal which depends upon the signals on the outputs (28, 32) of the first signal path (14) and the second signal path (16). Depending on the action defined by the control signal the controllable switching element (38) couples the output (28) of the first signal path (14) to the output (44) of the controllable switching element (38) or it couples the output (32) of the second signal path (16) to the output (44) of the controllable switching element (38). The above-mentioned signal processing circuit reduces the influence of inter-symbol interference in the signal.

5 Claims, 2 Drawing Sheets

APPARATUS FOR PROCESSING A SIGNAL RECEIVED VIA AN INFORMATION CARRIER

BACKGROUND OF THE INVENTION

The invention relates to an apparatus for processing a signal received via an information carrier, which apparatus comprises in succession a receiving unit for receiving the signal, an equalizer and a signal processing device.

An apparatus of the type defined in the opening paragraph is known from U.S. Pat. No. 4,905,102. The known apparatus reads a signal from an information carrier by means of a receiving unit. The signal thus obtained is subsequently applied to an equalizer and a signal-processing device. The known signal processing device includes a circuit for improving the applied signal. It has been found that the known signal processing device does not effectively suppress some disturbances in the signal.

SUMMARY OF THE INVENTION

It is an object of the invention to improve the signal by reducing the influence of inter-symbol interference, such as low-frequency noise and variations of the average signal value (baseline wander), on the zero crossings in the signals. To this end, the signal processing device is characterized in that the signal processing device includes:

a first and a second signal path each having an input and an output, the first and the second signal path having their inputs coupled to an input of the signal processing device, the first signal path including time delay means, the second signal path including differentiation means adapted to effect at least two differentiations with respect to time, a controllable switching element having a first and a second signal input, which first signal input is coupled to the output of the first signal path and which second signal input is coupled to the output of the second signal path, a control signal input arranged to receive a control signal for setting the controllable switching element to a first state or a second state, and a signal output coupled to the first signal input in the first state and coupled to the second signal input in the second state, a decision circuit having a first and a second input, which first input is coupled to the output of the first signal path and which second input is coupled to the output of the second signal path, and having an output coupled to the control input of the controllable switching element to transfer a control signal, the decision circuit being adapted to supply the control signal in dependence upon the signals applied to the first and the second input.

The apparatus in accordance with the invention operates as follows: In the apparatus a signal is read from an information carrier by means of a receiving unit. After this, the signal is equalized by an equalizer. However, the signal from the equalizer still contains disturbances as a result of which a bit detector which may have been coupled sometimes cannot detect the zero crossings in the original non-disturbed signal or detects them at the wrong instants. The signal from the equalizer is subsequently applied to the two signal paths of the signal processing device. In one path the signal is differentiated at least two times. As a result of this, peaks in the applied signal become more distinct. In the other path the signal from the equalizer is delayed by a time which substantially corresponds to the time delay introduced by the differentiation means. As a result of this, the signals reach the outputs of the first and the second signal path at substantially the same time. The decision circuit generates a control signal on the basis of the signals on the outputs of the first and the second signal path. The controllable switching element transfers the signal on the output of the first or the second signal path on the basis of the value of the control signal. As a result of this, the zero crossings in the signal become more distinct. The invention is suitable for an apparatus as mentioned in U.S. Pat. No. 4,905,102. However, it can be used in any apparatus in which an applied signal is disturbed by inter-symbol interference, such as TV equipment and mobile telephones.

An embodiment of the apparatus is characterized in that the decision circuit further includes comparison means for comparing the amplitudes of the signals applied to the first and the second input. In this embodiment the control signal indicates which of the signals on the two inputs has the larger amplitude.

A further embodiment of the apparatus is characterized in that the input of the signal processing device is adapted to transfer a sampled digital signal and the time delay means are adapted to delay the sampled digital signal by a time which is substantially equal to the time delay introduced by the differentiation means. The time delay means then ensure that time-equivalent samples are applied simultaneously to the decision circuit and the controllable switching element.

It is to be noted that from U.S. Pat. No. 3,252,098 an apparatus is known which includes a signal processing device comprising time delay means and a circuit for effecting two differentiations with respect to time. However, said apparatus neither includes an equalizer nor comparison means and switching means.

BRIEF DESCRIPTION OF THE DRAWING

These and other aspects of the invention will be described in more detail with reference to the drawings in which.

DESCRIPTION OF THE PREFERRED EMBODIMENT

Figure 1:
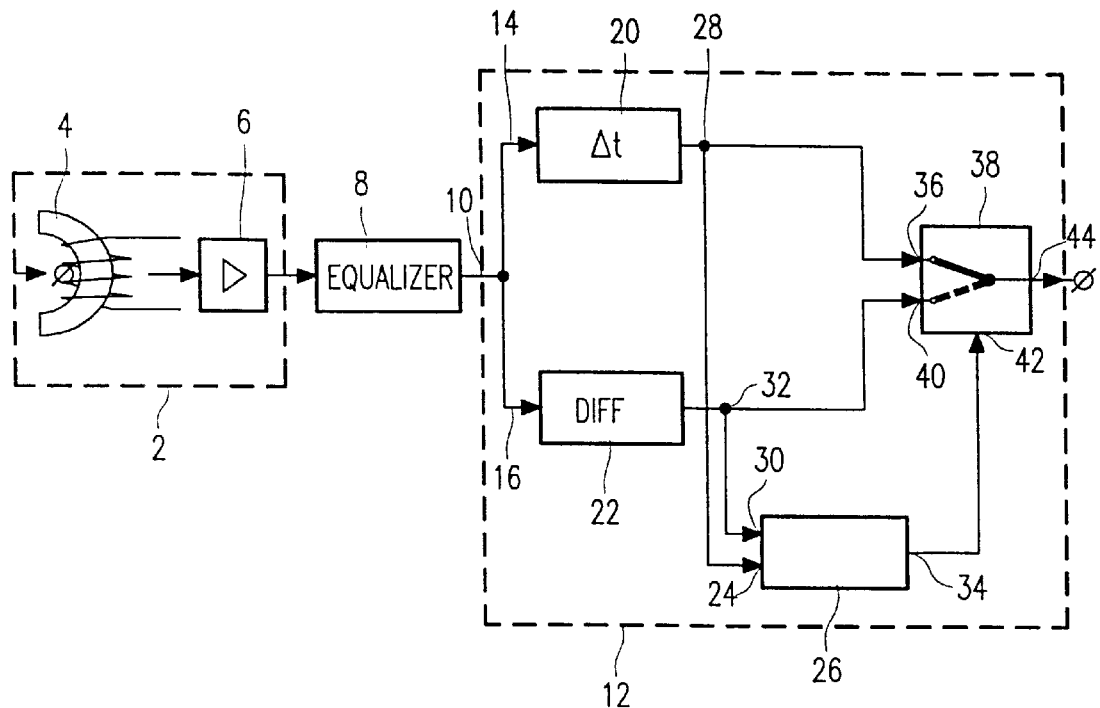
FIG. 1 is a block diagram of an embodiment of an apparatus in accordance with the invention.

FIG. 1 is a block diagram of an embodiment of an apparatus in accordance with the invention in the form of a playing apparatus. The apparatus includes a pickup element 2 for reading the signal from the information carrier. The pickup element 2 includes a read head 4 and usually also a preamplifier 6. The output of the pickup element 2 is coupled to an input 10 of a signal processing device 12 via an equalizer 8 adapted to equalize the signal. The signal processing device 12 has its input 10 coupled to the inputs of a first signal path 14 and a second signal path 16. The first signal path 14 includes means 20 for delaying the signal. The second signal path 16 includes means 22 for at least two times differentiating the signal with respect to time.

A first input 36 of a controllable switching element 38 is coupled to an output 28 of the first signal path 14. A second input 40 of the controllable switching element 38 is coupled to an output 32 of the second signal path 16. A control input 42 of the controllable switching element 38 is coupled to an output 34 of a decision circuit 26. A control signal on the control input 42 of the controllable switching element 38 determines whether the first input 36 or the second input 40 of the controllable switching element 38 is coupled to the output 44 of the controllable switching element 38.

The signal processing device shown in FIG. 1 can be implemented with analog components as well as time-discrete components.

A first input 24 of the decision circuit 26 is coupled to the output 28 of the signal path 14. A second input 30 of the decision circuit 26 is coupled to the output 32 of the second signal path 16. The decision circuit 26 supplies a signal, which is dependent on the signals applied to the first input 24 and the second input 32 of the decision circuit 26, to the output 34 of the decision circuit 26.

The signal processing device shown in FIG. 1 can be implemented with analog or time-discrete components.

Figure 2:
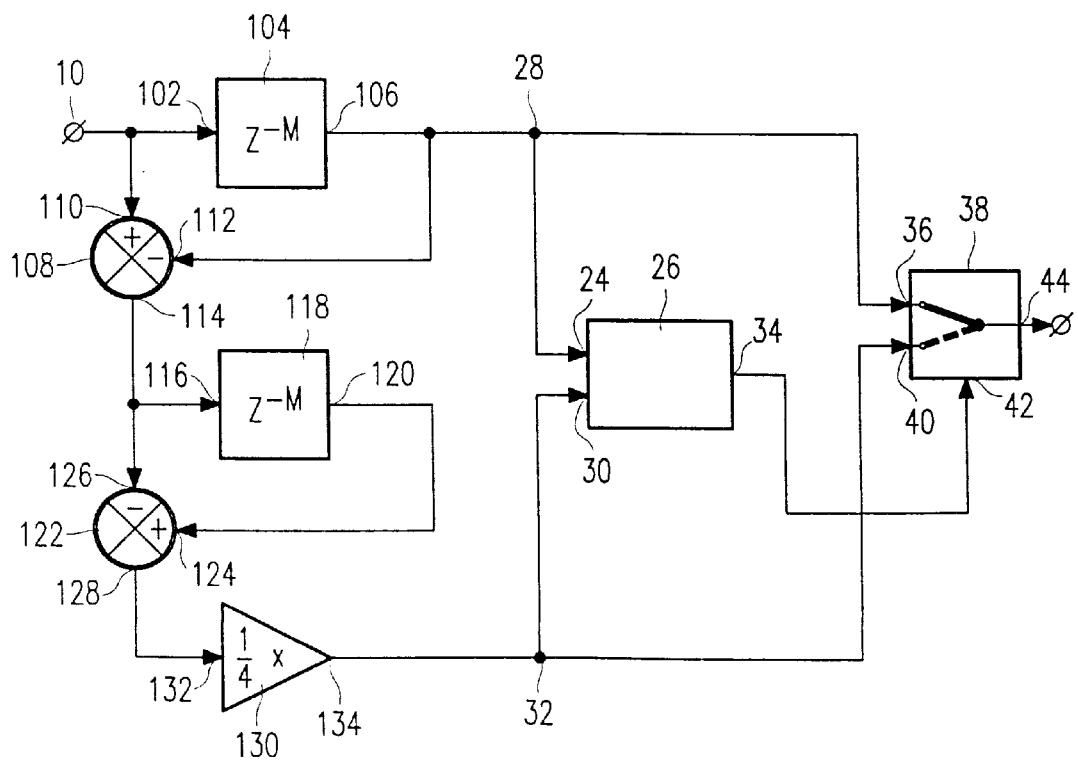
FIG. 2 shows a modification of the signal processing device shown in FIG. 1.

FIG. 2 shows a modification of the signal processing device shown in FIG. 1. All the elements in the Figure are controlled by a clock signal having the frequency $f_S$. The clock signal is generated by a clock generator, not shown. The signals in the Figure have been sampled with the frequency $f_S$. The input 10 of the signal processing device 12 is coupled to the input 102 of a first time delay element 104. The signal on the input 102 is delayed by M clock periods and is applied to the output 106 of the first time delay element 104. The parameter M in said function is a constant having a value greater than or equal to 1.

A first subtracter circuit 108 has a first input 110 coupled to the input 10 of the signal processing device 12, a second input 112 coupled to the output 106 of the delay element, and an output 114 for transferring the subtraction result.

A second time delay element 118 has an input 116 coupled to the output 114 of the subtracter circuit 108 and has an output 120 for transferring the input signal delayed by M clock periods.

A second subtracter circuit 122 has a first input 124 coupled to the output 120 of the second time delay element 118, a second input 126 coupled to the output 128 of the second subtracter circuit 122, and an output 128 for transferring the subtraction result.

A multiplier circuit 130 has an input 132 coupled to the output 128 of the second subtracter circuit 122 and has an output 134 for transferring the input signal multiplied by a constant ¼.

The first time delay element 104 and the first subtracter circuit 108 together form a circuit for a first-order differentiation with respect to time. The signal on the output 114 of the first subtracter circuit 108 corresponds to a first-order differentiated signal received from the input 10 of the signal processing device 12.

The second time delay element 118 and the second subtracter circuit 122 together form a circuit for a first-order differentiation with respect to time, the output signal of the circuit being inverted. The signal on the output 128 of the second subtracter circuit 122 is inverted because the coupling to the first input 124 and the second input 126 has been interchanged with respect to the coupling to the first input 110 and the second input 112 of the first subtracter circuit 108. By means of the afore-mentioned circuits it is achieved that the signal on the output 128 of the second subtracter circuit 122 corresponds to an inverted second-order differentiated signal from the input 10 of the signal processing device 12.

The constant ¼ of the multiplier circuit 130 has been selected in such a manner that the maximum gain provided by the two first-order differentiation circuits and the multiplier circuit together is substantially equal to 1.

Moreover, the time delay element 104 in the present embodiment provides a time delay which is substantially equal to the time delay introduced by the succession of the two first-order differentiation circuits and the multiplier circuit 130. As a result, the decision circuit 26 and the controllable switching element 38 receive time-equivalent samples at their inputs.

Table 1 represents three possible versions of the decision circuit 26. In the Table the parameters IN1 and IN2 represent the time-equivalent samples on, respectively, the first input 24 and the second input 30 of the decision circuit 26. The last two columns specify the actions to be transferred to the controllable switching element 38 by means of the control signal.

TABLE 1

Three possible versions of the decision circuit

| | Condition | Criterion | Action Criterion true | Action Criterion false |
|---|---|---|---|---|
| 1 | not applicable | |IN2| > |IN1| | select IN2 | select IN1 |
| 2 | pol(IN1) = pol(IN2) | |IN2| > |IN1| | select IN2 | select IN1 |
| | pol(IN1) ≠ pol(IN2) | |IN2| > 2x |IN1| | select IN2 | select IN1 |
| 3 | pol(IN1) = pol(IN2) | |IN2| > |IN1| | select IN2 | select IN1 |
| | pol(IN1) ≠ pol(IN2) | true | select IN1 | select IN1 |

The first embodiment of the decision circuit 26 utilizes a criterion to determine the action to be transferred to the controllable switching element 38 by means of the control signal. When the amplitude of the signal on the second input 30 is larger than the amplitude of the signal on the first input 24 the controllable switching element is set to the state in which the second input 40 of the controllable switching element 38 is coupled to the output 44 of the controllable switching element 38. When the amplitude of the signal on the second input 30 is smaller than or equal to the amplitude of the signal on the first input 24, the controllable switching element is set to the state in which the first input 36 of the controllable switching element 38 is coupled to the output 44 of the controllable switching element 38.

The second embodiment of the decision circuit 26 utilizes a condition and a criterion to determine the action to be transferred to the controllable switching element 38 by means of the control signal. When the condition is satisfied the criterion is evaluated. This means that if the polarity of the signal on the first input "pol (IN1)" and the polarity of signal on "pol(IN2)" the second input 30 of the decision circuit 26 are equal is determined whether the amplitude of the signal on the second input 30 is larger than the amplitude of the signal on the first input 24. Compliance with this criterion results in the action in which the second input 40 of the controllable switching element 38 is coupled to the output 44 of the controllable switching element 38. Non-compliance with said criterion results in the action in which the first input 36 of the controllable switching element 38 is coupled to the output 44 of the controllable switching element 38. However, if the condition is true that a signal on the first input 24 of the decision circuit 26 has another polarity than a signal on the second input 30 of the decision circuit 26, it is determined whether the amplitude of the signal on the second input 30 is larger than twice the amplitude of the signal on the first input 24. Compliance with this criterion results in the action in which the second input 40 of the controllable switching element 38 is coupled to the output 44 of the controllable switching element 38. Non-compliance with said criterion results in the action in which the first input 36 of the controllable switching element 38 is coupled to the output 44 of the controllable switching element 38.

A third embodiment differs from the second embodiment in that in the case that the signals on the two inputs of the decision circuit 26 have different polarities, always the first input 36 of the controllable switching element 38 is coupled to the output 44 of the controllable switching element 38.

Figure 3:
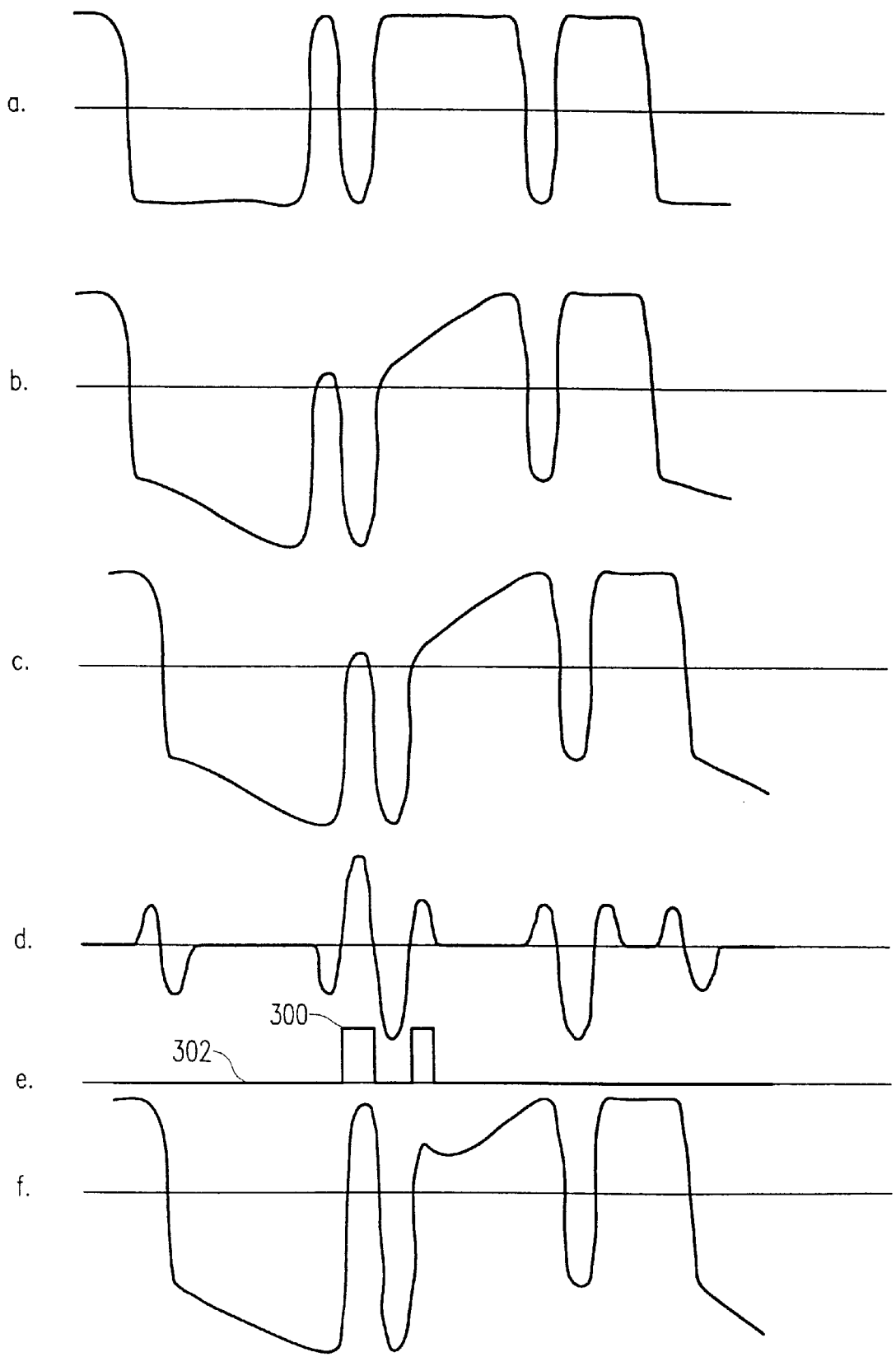
FIG. 3 diagrammatically shows examples of signal waveforms with the aid of which the operation of the signal processing device in accordance with the invention is explained.

The operation of the invention shown in FIG. 1 will be explained with reference to the diagrammatic representation of the signal waveforms in the time diagrams in FIGS. 3a, 3b, 3c, 3d, 3e and 3f. The signals in the time diagrams are time-continuous representations of the time-discrete signals used in an embodiment. FIG. 3a shows the error-free signal before it is stored on the information carrier. After the signal has been read from the information carrier by means of a pick-up element 2 and has been equalized by the equalizer 8 a signal as shown in FIG. 3b is obtained on the input 10 of the signal processing device 12. This Figure clearly shows that some peaks in the signal can drop to values around the average signal value as a result of baseline wander. As a result of this, the zero crossings of these peaks sometimes cannot be detected or are detected at the wrong instants, for example, in a coupled bit detector (not shown). FIG. 3c shows the signal obtained on the output 28 of the first signal path 14, which includes time delay means 20, when the signal of FIG. 3b is applied.

When the signal shown in FIG. 3b is differentiated two times in that the second signal path 16 includes means 22 for performing two differentiations with respect to time, a signal as shown in FIG. 3d is obtained on the output 32 of the second signal path.

Subsequently, the signal shown in FIG. 3c and FIG. 3d is applied to, respectively, the first input 24 and the second input 30 of the decision circuit. If the decision circuit 26 is in accordance with version 1 of Table 1, the output 34 of the decision circuit 26 supplies a control signal as shown in FIG. 3e to the input 42 of the controllable switching element 38. The high value 300 corresponds to the action "Select IN2" and the low value 302 corresponds to the action "Select IN1".

The control signal shown in FIG. 3e is applied to the input 42 of the controllable switching element 38 and ensures that the signals applied to the first input 36 and the second input 40, which signals are as shown in FIG. 3c and FIG. 3d, respectively, are coupled to the output 44, as a result of which a signal as shown in FIG. 3f is obtained. In the signal now obtained the zero crossings are more in conformity with the zero crossings in the original signal (FIG. 3a) than the zero crossings in the signal (FIG. 3b) on the input 10 of the signal processing device 12.

It will be evident that the embodiment having a receiving unit in the form of a pickup element 2 has been given merely by way of example. The information carrier in said embodiment can take the form of a tape or disc. However, alternatively a receiving unit can be adapted to receive signals via a digital transmission channel, such as signals via a cable or via the ether. An apparatus in accordance with the invention improves signals received from said information carriers by reducing the influence of inter-symbol interference on the zero crossings of these signals.

What is claimed is:

1. An apparatus for processing a signal received via an information carrier, which apparatus comprises in succession a receiving unit for receiving the signal, an equalizer and a signal processing device, characterized in that the signal processing device includes:

a first and a second signal path each having an input and an output, the first and the second signal path having their inputs coupled to an input of the signal processing device, the first signal path including time delay means, the second signal path including differentiation means adapted to effect at least two differentiations with respect to time, a controllable switching element having a first and a second signal input, which first signal input is coupled to the output of the first signal path and which second signal input is coupled to the output of the second signal path, a control signal input arranged to receive a control signal for setting the controllable switching element to a first state or a second state, and a signal output coupled to the first signal input in the first state and coupled to the second signal input in the second state, a decision circuit having a first and a second input, which first input is coupled to the output of the first signal path and which second input is coupled to the output of the second signal path, and having an output coupled to the control input of the controllable switching element to transfer a control signal, the decision circuit being adapted to supply the control signal in dependence upon the signals applied to the first and the second input.

2. An apparatus as claimed in claim 1, characterized in that the decision circuit further includes comparison means for comparing the amplitudes of the signals applied to the first and the second input.

3. An apparatus as claimed in claim 2, characterized in that the decision circuit further includes comparison means for comparing the polarities of the signals applied to the first input and the second input.

4. An apparatus as claimed in claim 2, characterized in that the input of the signal processing device is adapted to transfer a sampled digital signal and the time delay means are adapted to delay the sampled digital signal by a time which is substantially equal to the time delay introduced by the differentiation means.

5. A signal processing device for use in an apparatus as claimed in claim 1, characterized in that the signal processing device includes:

a first and a second signal path each having an input and an output, the first and the second signal path having their inputs coupled to an input of the signal processing device, the first signal path including time delay means, the second signal path including differentiation means adapted to effect at least two differentiations with respect to time, a controllable switching element having a first and a second signal input, which first signal input is coupled to the output of the first signal path and which second signal input is coupled to the output of the second signal path, a control signal input arranged to receive a control signal for setting the controllable switching element to a first state or a second state, and a signal output coupled to the first signal input in the first state and coupled to the second signal input in the second state, a decision circuit having a first and a second input, which first input is coupled to the output of the first signal path and which second input is coupled to the output of the second signal path, and having an output coupled to the control input of the controllable switching element to transfer a control signal, the decision circuit being adapted to supply the control signal in dependence upon the signals applied to the first and the second input.

\* \* \* \* \*